(12) United States Patent
Olgaard

(10) Patent No.: US 8,155,175 B2
(45) Date of Patent: Apr. 10, 2012

(54) METHOD FOR MEASURING MULTIPLE PARAMETERS OF A SIGNAL TRANSMITTED BY A SIGNAL GENERATOR

(75) Inventor: Christian Olgaard, Sunnyvale, CA (US)

(73) Assignee: Litepoint Corporation, Sunnyvale, CA (US)

( * ) Notice: Subject to any disclaimer, the term of this patent is extended or adjusted under 35 U.S.C. 154(b) by 824 days.

(21) Appl. No.: 12/267,165

(22) Filed: Nov. 7, 2008

(65) Prior Publication Data

US 2009/0061782 A1 Mar. 5, 2009

Related U.S. Application Data

(62) Division of application No. 11/161,692, filed on Aug. 12, 2005, now Pat. No. 7,564,896.

(51) Int. Cl.
*H04B 3/46* (2006.01)
*H04J 1/16* (2006.01)

(52) U.S. Cl. .......................... 375/225; 370/252

(58) Field of Classification Search .................. 375/224, 375/225; 455/115.1; 370/241, 252
See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz | |
| 5,138,608 A | 8/1992 | Kucera et al. | |
| 5,691,988 A * | 11/1997 | Yamada et al. | 714/704 |
| 5,910,977 A | 6/1999 | Torregrossa | |
| 6,169,763 B1 | 1/2001 | Woodward et al. | |
| 6,445,916 B1 | 9/2002 | Rahman | |
| 6,753,693 B2 | 6/2004 | Seo et al. | |
| 6,870,392 B2 | 3/2005 | Kilian et al. | |
| 6,896,086 B2 | 5/2005 | Ishizaki et al. | |
| 7,057,518 B2 | 6/2006 | Schmidt | |
| 7,463,140 B2 | 12/2008 | Schmidt | |
| 7,564,893 B2 | 7/2009 | O'Neill | |
| 7,672,367 B1 * | 3/2010 | Kimpe et al. | 375/225 |
| 7,890,822 B2 | 2/2011 | Behziz et al. | |
| 2001/0026150 A1 * | 10/2001 | Klenner | 324/76.26 |
| 2003/0153273 A1 | 8/2003 | Ebert et al. | |
| 2004/0233980 A1 | 11/2004 | Kemchen | |

OTHER PUBLICATIONS

International Search Report and Written Opinion for International Application No. PCT/US06/28836 dated Jan. 28, 2008, 4 pp.

* cited by examiner

*Primary Examiner* — Tesfaldet Bocure

(57) ABSTRACT

A method is disclosed for measuring one or more parameters of a signal generated by a signal generator. The method employs capturing and analyzing a train of data packets or other forms of signals from a single transmission to obtain measured values for the one or more parameters. The obtained measured values may be used in valuing a calibration of a signal generator or in verifying the already calibrated values of the signal generator. In accordance with a preferred embodiment, the train of data packets contains packets having different properties.

3 Claims, 8 Drawing Sheets

METHOD FOR MEASURING MULTIPLE PARAMETERS OF A SIGNAL TRANSMITTED BY A SIGNAL GENERATOR

RELATED APPLICATION DATA

This application is a divisional application based on U.S. patent application Ser. No. 11/161,692, filed Aug. 12, 2005, now issued as U.S. Pat. No. 7,564,896 on Jul. 21, 2009, entitled Method for Measuring Multiple Parameters of a Signal Transmitted by a Signal Generator, which prior application is hereby incorporated herein by reference.

BACKGROUND OF THE INVENTION

1. Field of the Invention

The present invention relates generally to calibration and testing of a transmitter (referred to herein as a data signal generator) and/or a receiver (referred to herein as a data signal receiver) and more particularly, to reduction in test time for performing the measurement of one or more parameters or properties of transmitted signals transmitted by a device under test (DUT) and/or received by a DUT.

2. Related Art

An electronic transmitter and/or receiver forms a basic component in mobile cell phones, wireless personal computers (PCs), and wireless devices in general. Typically, a wireless device is tested for acceptable performance before leaving production facilities. For example, part of the testing of the wireless device may include measuring quality parameters associated with a transmitted signal that is output by the wireless device and/or reception capabilities of the transmitted signal by the receiver of the wireless device.

Traditionally, production testing of a transmitter and/or receiver device has followed a sequential flow, testing one property of a transmitted or received signal at a time. The measurement capability of the testing equipment has in part driven the need for a sequential flow of testing. For example, typically, hundreds of data packet signals or packets are transmitted at a same transmitter setting or value for a property to be measured, e.g. the output power, to obtain an accurate measurement of the property due to the response time of the measurement system. For example, to obtain accurate results from a power meter, the device under test (DUT) or transmitter must send a same data packet signal or packet repeatedly while the power meter measures the power by averaging the measurements taken. The result is read back by the test system, and a decision is made regarding the next step of testing. If the power meter were to receive a transmission of data packet signals varying in output power, as versus receiving a transmission of packets at a same power level, the power meter would simply average the result, and not obtain a measurement of the output power of each transmission packet. Similar scenarios exist for other testing equipment, such as spectrum analyzers and other typical production measurement equipment for testing high frequency systems.

However, testing in such a sequential fashion increases the overall test time. For example, after transmission of a packet train of packets, e.g. several hundred packets, at a given output power, the power meter provides the output power measurement for the given output power setting of the transmitter. In order to obtain the transmitter's error vector magnitude (EVM) value for this power setting, another transmission of several hundred packets at the same transmitter power setting is output to be measured by EVM measuring equipment. After the EVM equipment obtains a value for the EVM for packets transmitted at the given output power setting of the transmitter, spectrum analyzer equipment may be employed to measure the spectral mask or spectral dissipation outside a predefined bandwidth. Again, several hundred packets are transmitted at the given power setting of the transmitter to allow the spectrum analyzer equipment to obtain a reading on the spectral mask for packets transmitted at the given output power.

An additional issue contributing to increased test time for testing transmission equipment and/or receiver equipment is that more modern transmitters and receivers are capable of transmitting and receiving data packet signals at multiple frequencies or data rates. Thus, the several properties to be measured, e.g. output power, EVM, and spectral mask, may need to be measured at multiple frequencies, besides multiple output power levels.

In view of the above, improvements are needed in determining measured values for multiple parameters or properties of a transmission of packets by a transmitter and/or reception capabilities by a receiver to receive the transmission of packets in a timely fashion. A need exists to produce the required measured values in a significantly lesser amount of test time than that offered by the traditional testing methods of the past.

SUMMARY OF THE INVENTION

A method is disclosed for measuring one or more parameters of a signal generated by a signal generator. The method employs capturing and analyzing a train of data packets or other forms of signals from a single transmission to obtain measured values for the one or more parameters. The obtained measured values may be used in valuing a calibration of a signal generator or in verifying the already calibrated values of the signal generator. In accordance with a preferred embodiment, the train of data packets contains packets having different properties.

In one embodiment, a method is provided for measuring one or more properties of an output signal generated by a data packet signal generator. The method includes generating a plurality of data packet signals by the data packet signal generator, a portion of the plurality of data packet signals having at least one property that varies in value over a calibrated range of the data packet signal generator. The portion of the plurality of data packet signals is received from the data packet signal generator for analysis. Measuring the value of the at least one property for the received portion of the plurality of data packet signals produces measured values.

In another embodiment, a method for measuring one or more properties of an output signal generated by a data packet signal generator is provided. The method includes generating a plurality of data packet signals by varying an output power and data rate of the data packet signals as generated by the data packet signal generator. The plurality of data packet signals are received for analysis. A portion of the received plurality of data packet signals is measured to produce measured values for at least one property of the data packet signals of the portion.

BRIEF DESCRIPTION OF THE DRAWINGS

The invention will be more readily understood in view of the following description when accompanied by the below figures and wherein like reference numerals represent like elements.

DETAILED DESCRIPTION OF THE INVENTION

In the following discussion, for purposes of consistency and simplicity of examples, the generated transmit signal is generally described in terms of data packet signals. However, in accordance with the presently claimed invention, the data signals need not necessarily be in the form of packet data. Alternatively, the generated transmit signals could be in other commonly used forms, such as continuous wave (CW) signals, which represent or otherwise correspond to the specific data, controls, parameters or characteristics sought to be measured, controlled, monitored or tested.

Additionally, the following discussion uses EVM as an example of a measure of signal quality. However, it should be understood that other measures of transmission signal quality can also be used in accordance with the presently claimed invention. For example, one may analyze the quality of a signal where multiple transmitters with different forms of modulation produce a combined signal, e.g., in a MIMO (Multiple Input Multiple Output) system, in which case traditional EVM may not be as useful due to mutual intereference among the signals, but a composite EVM of some form can be used to represent the transmitter quality. Similarly, when measuring transmit quality for a traditional GSM transmitter, the quality is generally represented in terms of integrated phase error, rather than EVM.

With the advent of more modern testing equipment, e.g. a vector signal analyzer (VSA) and/or a vector signal generator (VSG), an alternative to the traditional sequential testing and measurement of the properties of a transmission by a data packet signal generator and the reception capabilities of a data packet signal receiver may be provided with an improvement in test time reduction. With the use of more modern testing equipment, e.g. the VSA, a testing process or methods may be employed wherein multiple properties, e.g. output power, EVM, and spectral mask, may be measured for individual packets of a single transmission or packet train. The following is organized with FIGS. 1-4 pertaining to improvement in test time for testing a data packet signal generator and FIGS. 5-8 pertaining to improvement in test time for testing a data packet signal receiver.

Figure 1:
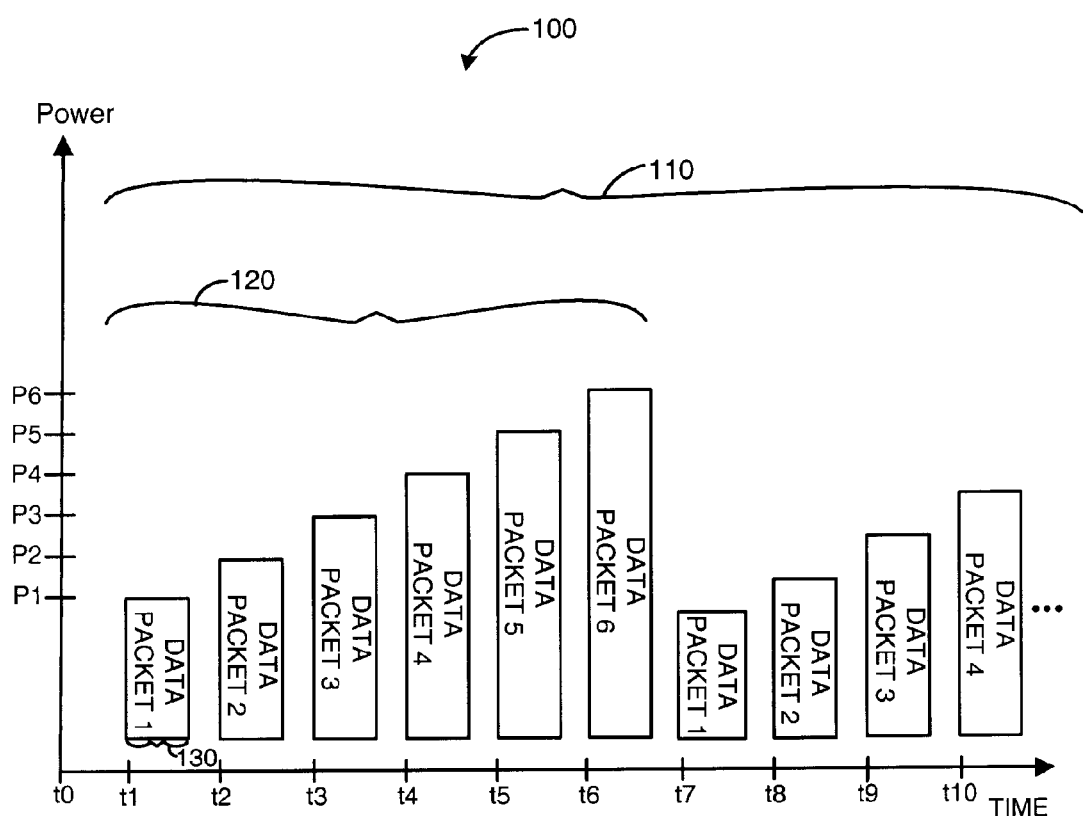
FIG. 1 illustrates a chart showing an example embodiment of a plurality of data packet signals as generated by a data packet signal generator and received by an analyzing device.

FIG. 1 illustrates a chart 100 showing an example embodiment of a plurality of data packet signals 110 as generated by a data packet signal generator and received by an analyzing device. Herein, data packet signals are also referred to as just packets or data packets. The chart 100 of FIG. 1 shows a plot of packet power level vs. time in accordance with a measurement method or methods as herein described. As shown in FIG. 1, a portion 120 of the plurality of data packet signals 110 repeats periodically, e.g. data packet 1 (DP1), data packet 2 (DP2), ..., and data packet 6 (DP6) repeat again beginning at time t7. Although the portion 120 is shown with six data packets, a portion may have more than or less than six data packets. The sequence of six data packets DP1-DP6 is shown starting at time t1 and repeats again beginning at time t7. Packet DP1 begins at times t1 and t7, Packet DP2 begins at times t2 and t8, ..., with time t1<time t2<time t3<.... The example of FIG. 1 also shows the packets DP1-DP6 progressively increasing in output power level, e.g. packet DP1 has power level P1, packet DP2 has power level P2, packet DP3 has power level P3, ..., and P1<P2<P3<.... Each packet in the plurality of data packet signals 110 is shown with the same or constant packet width, e.g. the packet width 130 of packet DP1. Packets with a same width represent packets transmitted at a same datarate, e.g. 54 Mbps. Each of the plurality of data packet signals 110 may have a same data or a random data, but in the example of FIG. 1, each are assumed to be a same size and transmitted at the same data datarate.

However, embodiments other than the one exemplified in FIG. 1 may be used for the methods herein disclosed. For example, the number of data packets in the portion 120 need not be six. The output power levels P1-P6 corresponding to the packets DP1-DP6 need not be increasing, and two or more packets of the portion 120 may even have the same power level. The data packet signal generator should vary, though, the property or properties to be measured in at least two packets of the portion 120.

The plurality of data packet signals 110 of FIG. 1 are generated by a data packet signal generator or transmitter needing calibration with measured values or needing verification of calibration values against measured values. An analyzing device, such as a vector signal analyzer (VSA), may be used to capture the portion 120 of the plurality of data packet signals 110. For example, the VSA may receive the plurality of data packet signals 110 and store the portion 120 in a memory, and later retrieve the stored received portion 120 from the memory for analysis. The capture of the portion 120 may be done by triggering on a packet property, e.g. the power level, of a given packet and accepting packets until a packet with the same property value, e.g. same power level, is detected. The packet with the same property value signals the beginning of another repeated portion 120. As an example, the VSA may trigger to begin capturing packets when a packet with power level P2 is detected, e.g. data packet DP2 at time t2. Packets are captured and stored in a memory for later analysis until another packet with power level P2, e.g. data packet DP2 at time t8, is detected. In this way, the VSA may capture and store for later analysis packets DP2, DP3, DP4, DP5, DP6, and DP1. Alternatively, the VSA may be set to trigger on a packet with power level P5. In this case, the packets DP5, DP6, DP1, DP2, DP3, and DP4 may be captured and stored as the portion 120.

The VSA may allow some predetermined number of packet trains or portions 120 to pass before triggering and collecting a portion 120. Often times the transmitter requires time to settle or reach an equilibrium, and thus the VSA may not begin collecting or capturing packets (triggering) until enough time has passed to allow for settling of the transmitter. Alternatively, the VSA may not be set up with a triggering, but may be used in a free running mode wherein the time for collecting packets may be longer than a packet train or portion 120 to ensure collection of complete packets of a complete packet train. Enough time is allowed to pass before collecting packets to ensure settling of the system. Letting the system settle before taking the measurement may make more difficult the detection of the start of a packet train as any packet can trigger the measurement system. However, knowing the type of packets and the packet order may simplify the task of identifying a packet at a given location in the order. The capture time should be equal to or longer than the period of the train of packets to be captured.

As soon as the packet capture is completed for a transmitted portion, e.g. the portion 120, the VSA or measurement system can proceed with capturing another portion 120 at a next frequency or data rate, while the packets captured at the previous frequency or data rate are analyzed. In this way, testing time may be reduced for testing transmitters capable of transmitting at multiple data rates or frequencies.

Figure 2:
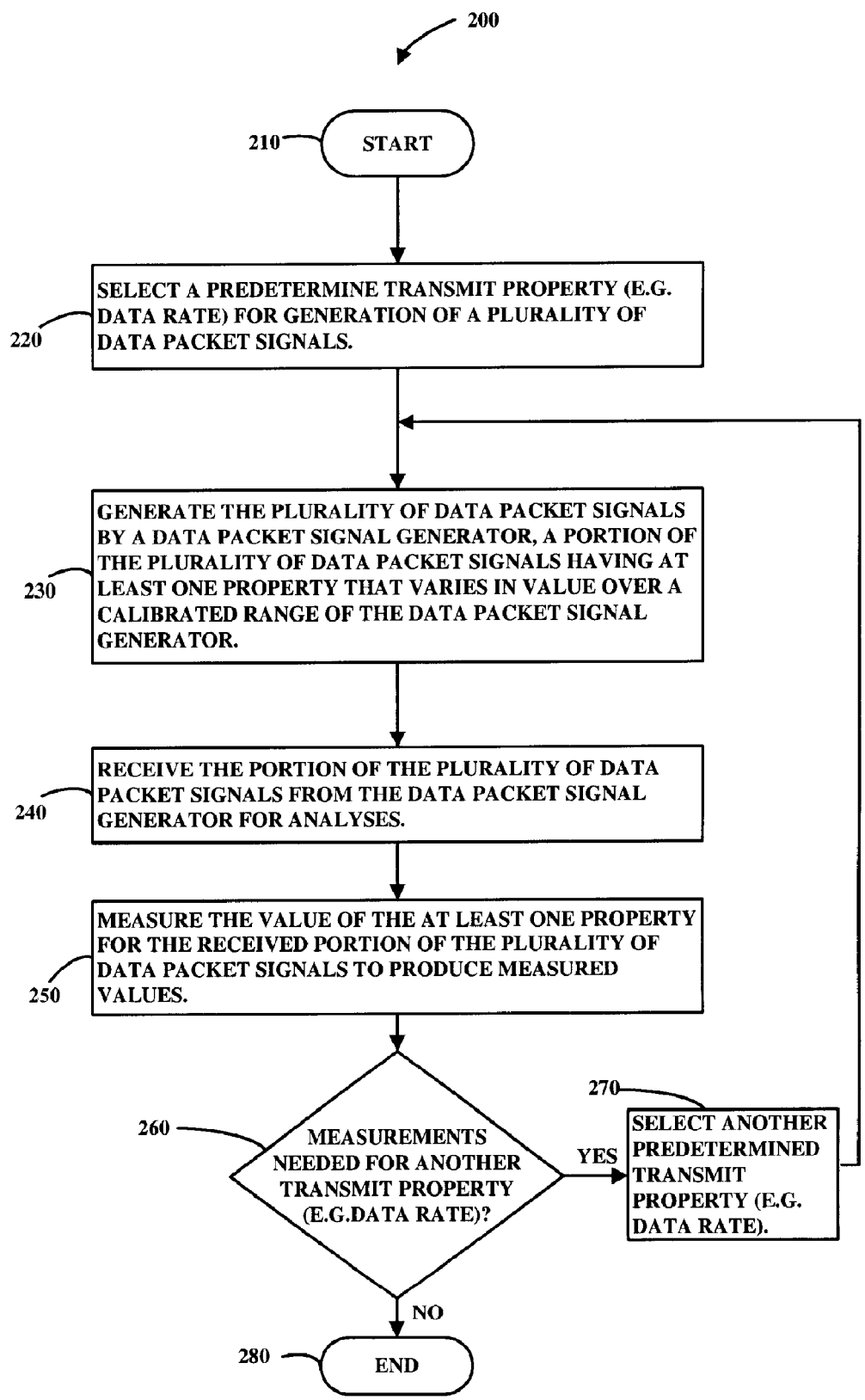
FIG. 2. illustrates a flowchart describing an example of a method for measuring one or more properties of an output signal generated by a data packet signal generator.

FIG. 2. illustrates a flowchart describing an example of a method 200 for measuring one or more properties of an output signal generated by a data packet signal generator. The example method of FIG. 2 begins at block 210 by preparing the data packet signal generator to generate a plurality of data packet signals 110. At block 220, a predetermined frequency or transmit property (e.g. data rate(s)) is selected for the generation of the plurality of data packet signals 110. It is possible to generate a packet, for example, a section of a continuous wave signal, having multiple data rates for a transmit property. It is to be understood that although the term "data packet" or "packet" has been used herein, e.g. the packets 510, 520, 530, 540, 550, and 560 in FIG. 5, the term "data packet" or "packet" may refer to the sections of a continuous wave (CW) signal. At block 230, the plurality of data packet signals 110 is generated at the selected predetermined frequency or transmit property by the data packet signal generator. A portion 120 of the generated plurality of data packet signals 110 has at least one property that varies in value over a calibrated range, e.g. a range with graduations, of the data packet signal generator. For example, the at least one property may include packet output power, and may be varied over a range of output power, e.g. from power level P1 through P6 as shown in FIG. 1. The output power levels P1-P6 of the generated portion 120 span a calibration, e.g. a set of graduations, of the data packet signal generator, the calibration either to be assigned values or to have assigned values verified based on measured values. In one embodiment, the method maps to the calibrated range the measured values, and extrapolates values for the calibrated range for points of the calibrated range between the measured values. In another embodiment, the method verifies values of the calibrated range of the data packet signal generator against the measured values of the at least one property. In yet another embodiment, each data packet signal in the portion 120 has a different value for the at least one property (e.g. output power), the different values spanning the calibrated range of the data packet signal generator.

At block 240, the portion 120 of the plurality of data packet signals 110 is received by the receiving analyzing device, e.g. the VSA. At block 250, the VSA measures the value of the at least one property for the received packets of the portion 120 to produce measured values.

The measured values produced by block 250 may include values for multiple properties. For example, the measured values may include values for the output power, error vector magnitude (EVM), and spectral content or mask of the packets of the portion 120. With the use of a sophisticated measuring device, e.g. a VSA, measurements of multiple packet properties may be made on the packets of the portion 120. Testing time may be reduced for production testing of electronic transmitters by measuring multiple properties of an individual packet in the captured portion 120 of the plurality of data packet signals 110.

At block 260 a test is performed to determine whether measurements are needed at other predetermined transmission frequencies or transmission properties. If so, at block 270 another predetermined transmission frequency or property is selected for another transmission of data packets. Processing then flows from block 270 back to block 230 to repeat the blocks of processing for blocks 230, 240, and 250. If at block 260 additional measurements are not needed, processing ends at block 280 by making the measured values available to the user or tester. It should be understood that two parallel operations could be implemented for FIG. 2 such that the measurement operation is done in parallel with the next capture (generate and receive) operation.

Figure 3:
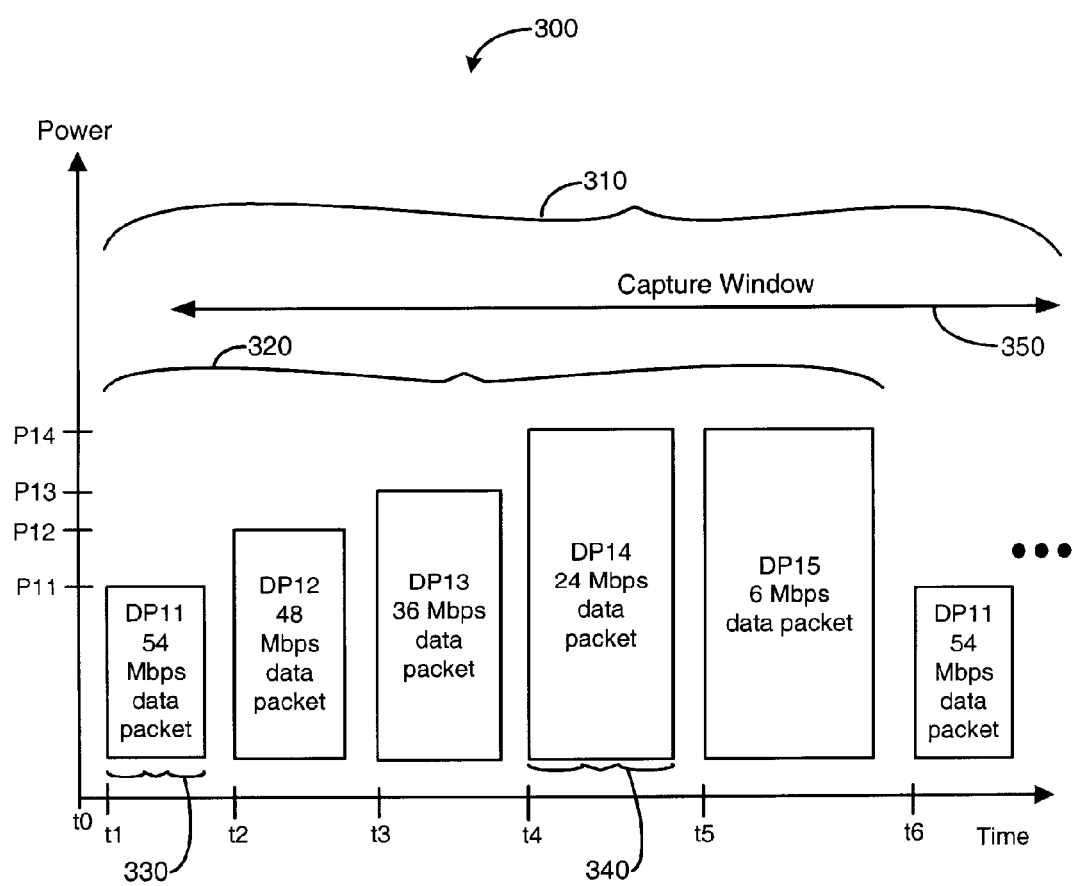
FIG. 3 illustrates another chart showing an example embodiment of a plurality of data packet signals as generated by a data packet signal generator and received by an analyzing device.

FIG. 3 illustrates another chart 300 showing an example embodiment of a plurality of data packet signals 310 as generated by a data packet signal generator and received by an analyzing device. The chart 300 of FIG. 3 illustrates a packet train that may be used in a measurements method to verify the performance of a device capable of transmitting multiple data rates at multiple power levels. In FIG. 3, as compared to FIG. 1, the frequency or data rate is varied as well as the output power of transmitted packets of a portion 320 of the plurality of data packet signals 310. The width of a packet, e.g. the width 330 of data packet 11 (DP11), represents the data rate of the packet, e.g. 54 Mbps for DP1. Thus, as illustrated in FIG. 3, the width 330 (representing 54 Mbps) of DP11 is different from the width 340 (representing 24 Mbps) of data packet 14 (DP14). The time between packets of a transmission of packets may also vary depending on the analysis needed. For example, for a spectral mask measurement, a longer capture time or capture window 350 may be needed to obtain the desired averaging of the spectral mask. For optimal operation, the packet length may depend on the measured property, e.g. for EVM measurement, all packets can be the same length independent of the data rate (EVM is measured over X symbols, and the data rate uses the same symbol length). For power the same is true, but the packet length may be different for different power levels.

FIG. 3 exemplifies a typical packet train that may be used to test compliance of a transmitter to a standard, e.g. the IEEE 802.11g standard. Power and EVM may be measured for packets generated at 54 Mbps (e.g. DP11), 48 Mbps (e.g. DP12), and 36 Mbps (e.g. DP13). In addition, the portion 320 includes packet DP14 (24 Mbps) that may be measured for power, EVM, and spectral mask and DP15 (6 Mbps) that may be measured for power and spectral mask. Packets transmitted at 24 Mbps and 6 Mbps are typically at the same power level because regulations on spectral mask typically require the power level be kept low enough such that spectral dissipation outside the allowed spectral bandwidth be kept within regulated limits. Thus power may not be increased further for packets with transmission rates below 24 Mbps. As shown in FIG. 3, DP11-DP13 have corresponding power levels P11-P13, and DP14 and DP15 have the same power level P14. Thus, the packet train or the portion 320 with consecutive packets DP11, DP12, DP13, DP14, and DP15 can be used to measure all of the above noted packet parameters or properties with a single transmission and capture of packets transmitted at various data rates.

Figure 4:
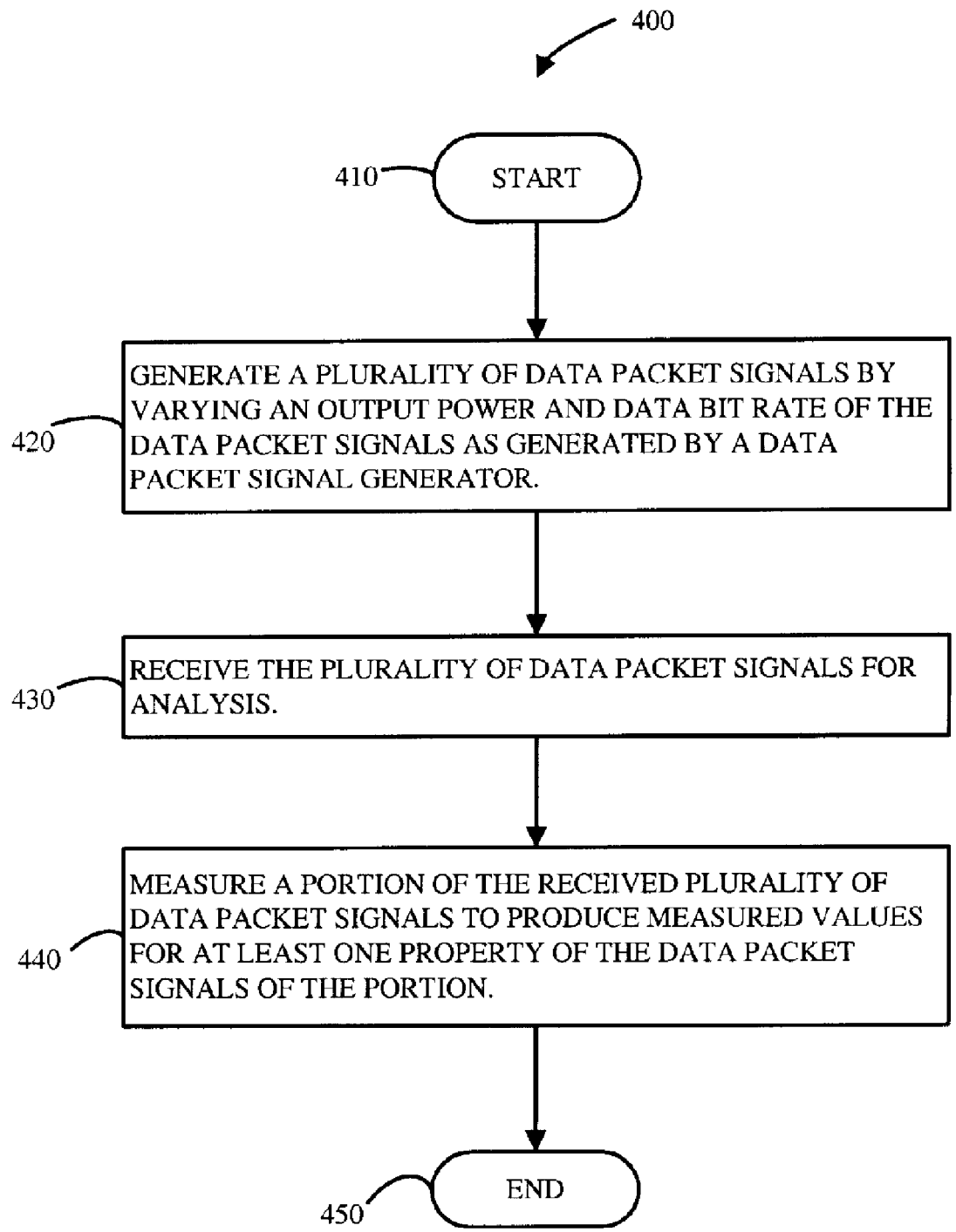
FIG. 4 illustrates a flowchart describing an example of a method that measures one or more properties of an output signal generated by a data packet signal generator.

FIG. 4 illustrates a flowchart describing an example of a method 400 that measures one or more properties of an output signal generated by a data packet signal generator. The example method 400 begins at block 410 by preparing the data packet signal generator to generate a plurality of data packet signals, for example, the plurality of data packet signals 310 of FIG. 3. As described for FIG. 3, the portion 320 of the plurality of data packet signals 310 has data packet signals that differ in both transmission data rate and output power from other data packet signals of the portion 320. It may be that each of the data packet signals of the portion 320 are varied in both data rate and output power. At block 420, a plurality of data packet signals, e.g. the plurality of data packet signals 310, is generated by varying an output power and data rate of the data packet signals as generated by the data packet signal generator. At block 430, the plurality of data packet signals is received for analysis. At block 440, a portion, e.g. the portion 320, of the received plurality of data packet signals is measured to produce measured values for at least one property of the data packet signals of the portion.

The measured values produced in block 440 may include values for multiple properties. For example, the measured values may include values for the output power, error vector magnitude (EVM), and spectral content or mask of the packets of the portion 320. With the use of a sophisticated measuring device, e.g. a VSA, measurements of multiple packet properties may be made on the packets of the portion 320.

At block 450, the processing of method 400 ends by making the measured values available to the user or tester. The measured values may, for example, be used to verify the values of a calibrated range of the data packet signal generator.

Similar to the use of a multipacket transmission of packets with varying packet properties by a data packet signal generator for analysis, one can also utilize a multi-packet reception of packets with varying packet properties by a data packet signal receiver. The use of one multi-packet transmission of packets with varying packet properties may provide for a reduction in test time for both the data packet signal generator and the data packet signal receiver.

In accordance with the discussion in U.S. patent application Ser. No. 10/908,946, filed Jun. 1, 2005 (the disclosure of which is incorporated herein by reference), a multi-packet train or transmitted signal comprised of packets with varying packet properties can be used to make a timely determination of the sensitivity or performance of a data packet signal receiver. In accordance with the presently claimed invention, a transmitted signal or multi-packet train comprised of varying packet properties can be used to timely determine the receive capability of a data packet signal receiver to receive multiple data rates. Additionally, this disclosure further describes the use of a signal with a packet train of packets at multiple power levels to test/adjust (e.g. calibrate) the accuracy of the receive signal strength indicator (RSSI) of the data packet signal receiver.

Production testing of a receiver typically may require testing time to determine the sensitivity of the receiver and to ensure the device performs according to specification. Sensitivity and performance according to specification may be measured as a combination of a noise figure of the analog front end and a performance verification of the digital signal processing in the modem.

A modem receiver may support multiple data rates to obtain the best possible data throughput for the given signal level. An example of this is the IEEE 802.11g standard wherein most systems (transmitter and receiver) support 1, 2, 5.5, 6, 9, 11, 12, 18, 24, 36, 48, and 54 Mbps data rates. The basic difference in this case is the modulation and coding used to achieve these data rates. As the receiver will not know what data packet is to be received first, then next, and so forth, the receiver must have the analog (radio frequency or RF) portion of the receiver identical for all possibly received packets, so only the modem (digital signal processing (DSP)) portion will differ. Thus, testing of the data packet signal receiver may only require checking sensitivity at a single modulation or data rate, and verifying modem operation at the remaining data rates.

In a typical production test, the receiver is typically able to be operated in a mode wherein the receiver simply receives packets and counts the good and bad packets. From the count of good and bad packets, the receiver performance (sensitivity and data rate capabilities) may be determined.

Traditionally, a predetermined number of packets, e.g. 1000 packets, are transmitted at a given power level (or at multiple power levels as described in the aforementioned U.S. patent application Ser. No. 10/908,946) to test the sensitivity. If the pass limit is 10% packet error rate (PER), then 900 or more packets must be received to pass the sensitivity test.

Once passing the sensitivity test, it may be assumed that the noise figure is acceptable, and that the modem operates correctly for the given data rate. In the case of a multiple data rate receiver, what is left is to test the remaining data rates. Traditionally, one would start transmitting at a new data rate, to verify the correct operation of the receiver at that data rate. This is not efficient, though, as reconfiguring the system is needed to transmit and receive at a new data rate. To eliminate the time for reconfiguring the transmitter and receiver system, multiple packet transmit and receive testing may be done wherein the system is configured to transmit and receive a wave train of packets with packets at multiple data rates.

Figure 5:
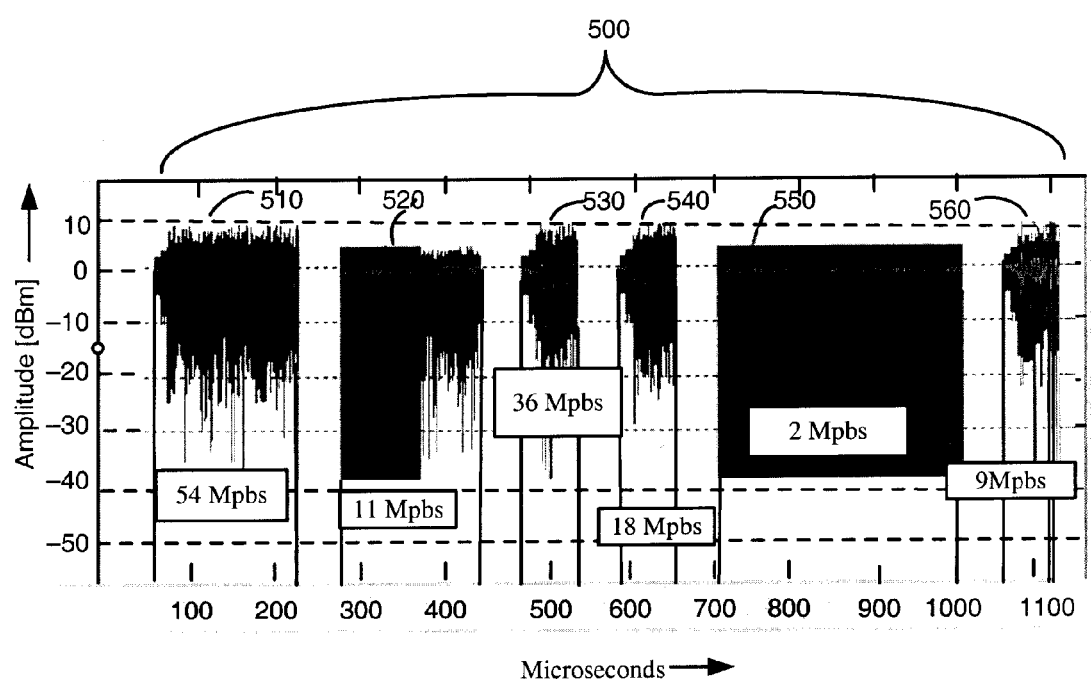
FIG. 5 illustrates a chart showing an example embodiment of a plurality of data packet signals as received by a data packet signal receiver.

Rather than transmitting a same packet multiple times, the example of FIG. 5 shows the transmission and reception of a wave train 500 of packets comprising one packet of each modulation or data rate to be tested. For example, FIG. 5 shows a fundamental waveform in a typical IEEE 802.11g standard receiver. A 48 Mbps packet is not shown in FIG. 5 since a 54 Mbps packet 510 and the 48 Mbps packet (not shown) are identical for the modem or modulation (orthogonal frequency-division multiplexing (OFDM) for which the data rates, in Mbps, are 54, 48, 35, 24, 18, 12, 9 and 6), only differing in coding. Likewise, a 12 Mbps packet is not shown in FIG. 5 since an 18 Mbps packet 540 and the 12 Mbps packet (not shown) are identical for the modem or modulation (OFDM), only differing in coding. Likewise, the same is true for a 11 Mbps packet 520 and a 5.5 Mbps packet (with direct-sequence spread spectrum (DSSS) modulation for which the data rates, in Mbps, are 11, 5.5, 2 and 1, and complementary code (CCK) coding) (not shown), a 36 Mbps packet 530 and a 24 Mbps packet (OFDM) (not shown), and so forth. In the example of FIG. 5, the transmitted signal or wave train 500 has all transmitted packets at a substantially same transmission power level.

Since in the example of FIG. 5 all packets of the wave train 500 have the same power level, if the packets are transmitted at a power level acceptable for the receiver sensitivity for the 54 Mbps packets, then all remaining packets should be received without problems if the modems for their data rates work correctly, as the lower data rates have a signal-to-noise ratio (SNR) requirement lower than the 54 Mbps.

In the example of FIG. 5, if 1000 of the wave train 500 are transmitted, and thus 1000 of each of the shown packets in the wave train 500, 6000 packets are transmitted for reception by the receiver. In this case only 54 Mbps packets are expected to fail, and at a sensitivity of 10% packet error rate (PER) for the 54 Mbps packets, only 100 of the 1000 54 Mbps packets would be expected to fail. Thus 5,900 of the 6000 transmitted packets, or 98.33% of the packets would be expected to be received correctly if the receiver modems are working correctly for the multiple data rates. If a modem does not work correctly for one of the packet types or data rates, one would easily see this, as an additional 1000 packets are likely to be missing in this case. In this manner, the count of the total number of correctly received packets for one transmission or wave train may be used to determine whether the data packet signal receiver is operating correctly at all data rates for which the receiver is tested.

In the example of FIG. 5, the shown packets of the packet wave train 500 may also have non-critical packets made shorter (e.g., transmitted with less data to make the execution time faster). The non-critical packets are those not tested at sensitivity level for their associated data rates, and thus it should not matter how long the non-critical packets are for the data rates tested at other than sensitivity. Accordingly, the 54 Mbps data packets of FIG. 5 may be tested at sensitivity if desired, and if so, are critical for use in determining sensitivity of the receiver. Ideally, the data packet signal receiver should report statistics for the individual data rates. If this were the case, a bad data packet signal receiver could be identified more easily.

Figure 6:
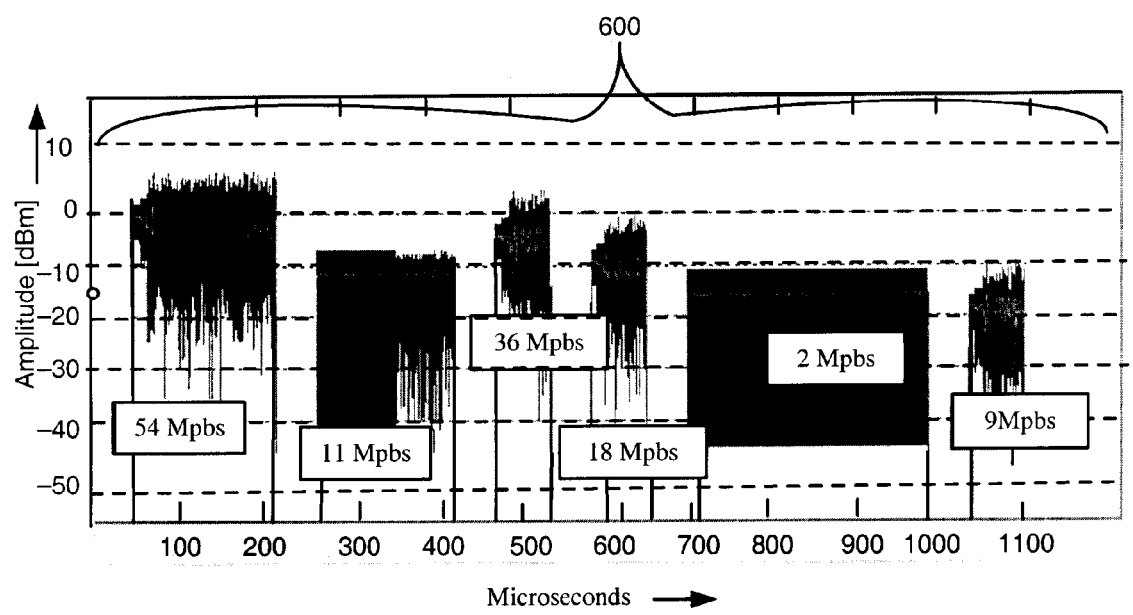
FIG. 6 illustrates another chart showing an example embodiment of a plurality of data packet signals as received by a data packet signal receiver.

In the example of FIG. 6, the individual packets of the wave train 600 are scaled in their transmit power level. Each packet of the wave train 600 is scaled or transmitted at a power level at the associated sensitivity for the packet data rate, so the pass level is expected to be at 90% good packets for a receiver with correctly operating modems. Again, if the modem fails for a given packet type, an additional 900 bad packets can be expected. So a failing modem should still be detectable. For example, in FIG. 6 if 1000 of each of the shown packets are transmitted at their sensitivity level, then with a 10% fail rate (PER) at each received data rate, one would expect 6*900 or 5400 packets received correctly (90% pass rate). If a modem failed 900 more packets would not be received correctly, giving a result of 4500 packets received correctly or a 75% pass rate. In this manner, the count of the total number of correctly received packets for one transmission or wave train 600 may be used to determine whether the data packet signal receiver is operating correctly at all data rates for which the receiver is tested. However, with regard to the example of FIG. 6, one should be careful in adding or testing too many data packet rates, as a good receiver could potentially mask a modem failing one data rate. For example, a packet train or waive train of 10 packets, each with different data rates, where all packets but one is received perfectly, could mask the one failing a 100%. For example, if a 1000 wave trains of 10 packets in a wave train with different data rates is transmitted and received such that 9 data rates are received perfectly (9*1000=9000 packets received correctly) and one modem is failing completely (so 1000 packets not received), then the result is still 9000 of 10000 packets received correctly, or a 10% fail rate (10% PER). Thus, what appears to be a good receiver having a pass rate of 90% is actually a failing receiver, failing completely at a given data rate.

Figure 7:
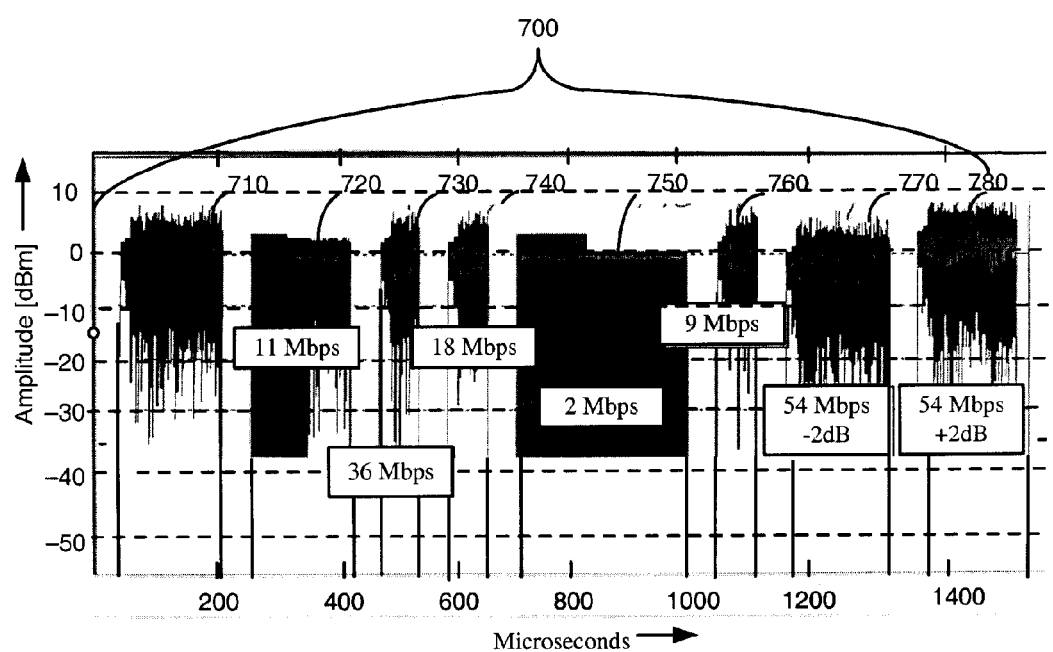
FIG. 7 illustrates yet another chart showing an example embodiment of a plurality of data packet signals as received by a data packet signal receiver.

It should be understood that someone skilled in the art can easily realize other combinations where some packets are scaled and some are not. For example, FIG. 7 shows a packet or wave train 700 wherein two packets 770 and 780, e.g. two data rates, are at power levels different from the rest of the wave train packets 710, 720, 730, 740, 750, and 760, the rest of the wave train packets being at a same power level. For example, the packets 770 and 780 could be at power levels corresponding to the sensitivity for the associated data packet rates.

It is to be understood that one of common knowledge in the art may further determine combinations of scaled power and multiple data rate packets to be used in accordance with the methods disclosed in the aforementioned U.S. patent application Ser. No. 10/908,946 to measure sensitivity of a given packet as well as test multiple data rates. The advantage of combining these is that only one wave train need be used to test all functionality, thus reducing the overall test time. It should be noted, that it may be difficult to combine varying data rate to test the sensitivity, as one will have a data rate where all data is likely to fail, and in this case, one will most likely not test the functionality of the modem at the same time, as most packets are already failing. However, as provided by the example of FIG. 7, multiple data rate packets may be tested on the "pass side" though.

Figure 8:
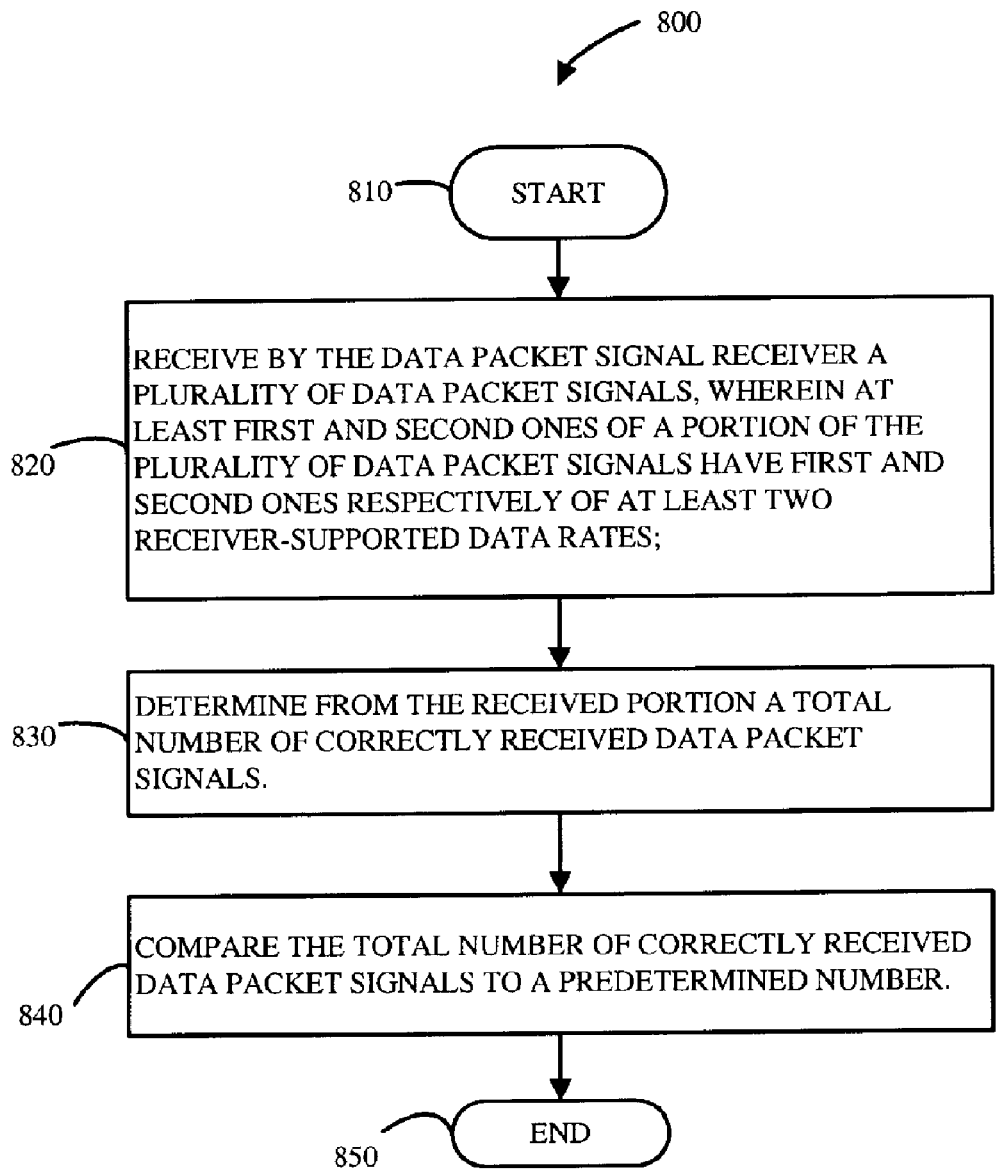
FIG. 8 illustrates a flowchart describing an example of a method to determine the capability of a data packet signal receiver to receive at multiple data rates.

FIG. 8 illustrates a flowchart describing an example of a method to determine the capability of a data packet signal receiver to receive at multiple data rates. The flowchart 800 begins at 810 with the transmission of a wave train some predetermined number of times, for example the wave train 500 of FIG. 5. At 820 the data packet signal receiver receives a plurality of data packet signals, wherein at least first and second ones of a portion of the received plurality of data packet signals have first and second ones respectively of at least two receiver-supported data rates. At 830 the total number of correctly received data packet signals is determined from the received portion. At 840, the total number of correctly received data packet signals is compared to a predetermined number. A correct operation of the data packet signal receiver at the at least two receiver-supported data rates may be determined as a result of the comparison. And at 850, the process of the flowchart 800 ends with the results being made available to the user.

Among the many advantages, the embodiments described herein provide for a reduction in test time for transmitter/receiver systems by determining measured values for multiple properties or parameters as varied for the packets of a single transmitted packet train or wave train. Testing time is reduced by measuring one or more packet properties, e.g. output power, EVM, and spectral mask, as the properties are varied in value within one single packet train transmission. Furthermore, multiple packet properties may be measured in a single packet train transmission wherein the packets are transmitted at different data rates. Many modem data packet signal receivers are capable of receiving at multiple data rates (e.g. have multiple modems) and may have all data rates tested by a single packet train transmission and reception. Thus, by employing the methods as described herein with more modern test equipment, e.g. a VSA and/or VSG, modern production measurement equipment may be configured and used to provide a single variable multi-packet wave train or transmission to reduce the testing time for both complex high frequency transmitters and receivers.

The above detailed description of the invention and the examples described therein have been presented for the purposes of illustration and description only and not by limitation. For example, the operations described may be done in any suitable manner. The method steps may be done in any suitable order still providing the described operations and results. It is therefore contemplated that the present invention cover any and all modifications, variations or equivalents that fall within the spirit and scope of the basic underlying principles disclosed above and claimed herein.

What is claimed is:

1. A method for testing a data signal receiver supporting multiple data rates, comprising:

receiving by the data signal receiver a plurality of data signals, wherein at least first and second ones of a portion of the plurality of data signals have first and second ones respectively of at least two receiver-supported data rates;

determining from the received portion a total number of correctly received data signals; and comparing the total number of correctly received data signals to a predetermined number.

2. The method according to claim 1, wherein said receiving includes receiving at least first and second data signals of the received portion of the plurality of data signals at first and second substantially equal power levels respectively.

3. The method according to claim 1, wherein said receiving includes receiving at least first and second data signals of the received portion of the plurality of data signals at first and second different power levels at first and second different receiver-supported data rates, respectively.

* * * * *